United States Patent
Howe et al.

(10) Patent No.: US 11,120,505 B2
(45) Date of Patent: Sep. 14, 2021

(54) IMAGE ANALYSIS SYSTEM FOR VERIFICATION OF PROPERTY ROOF DAMAGE

(71) Applicant: Conduent Business Services, LLC, Dallas, TX (US)

(72) Inventors: Richard L. Howe, Webster, NY (US); Edgar A. Bernal, Webster, NY (US); Valerie J. Raburn, South Haven, MI (US); Matthew Adam Shreve, Webster, NY (US)

(73) Assignee: Conduent Business Services, LLC, Florham Park, NJ (US)

( * ) Notice: Subject to any disclaimer, the term of this patent is extended or adjusted under 35 U.S.C. 154(b) by 807 days.

(21) Appl. No.: 15/172,499

(22) Filed: Jun. 3, 2016

(65) Prior Publication Data

US 2017/0352099 A1 Dec. 7, 2017

(51) Int. Cl.
   *G06Q 40/08* (2012.01)
(52) U.S. Cl.
   CPC .................. *G06Q 40/08* (2013.01)
(58) Field of Classification Search
   CPC .................................................. G06Q 40/08
   USPC .............................................................. 705/4
   See application file for complete search history.

(56) References Cited

U.S. PATENT DOCUMENTS

| | | | |
|---|---|---|---|
| 6,098,070 A | 8/2000 | Maxwell | |
| 6,219,930 B1 | 4/2001 | Reid | |
| 7,676,061 B2 | 3/2010 | Harrison et al. | |
| 8,078,875 B2 | 12/2011 | Cowburn et al. | |
| 8,170,840 B2 | 5/2012 | Pershing | |
| 8,209,152 B2 | 6/2012 | Pershing | |
| 8,346,578 B1 | 1/2013 | Hopkins, III et al. | |
| 8,401,222 B2 | 3/2013 | Thornberry et al. | |
| 8,401,877 B2 | 3/2013 | Salvagio | |
| 8,515,125 B2 | 8/2013 | Thornberry et al. | |
| 8,670,961 B2 | 3/2014 | Pershing et al. | |
| 8,731,234 B1 | 5/2014 | Ciarcia et al. | |
| 8,754,975 B2 | 6/2014 | Hjelmstrom et al. | |
| 8,756,085 B1 | 6/2014 | Plummer et al. | |
| 8,774,525 B2 | 7/2014 | Pershing | |
| 8,775,219 B2 | 7/2014 | Swanson et al. | |
| 8,818,572 B1 | 8/2014 | Tofte et al. | |

(Continued)

OTHER PUBLICATIONS

Krizhevsky A. et al., "ImageNet Classification with Deep Convolutional Neural Networks", Advances in Neural Information Processing System 25, 2012, p. 1106-1114.

(Continued)

*Primary Examiner* — Cho Kwong
(74) *Attorney, Agent, or Firm* — Fox Rothschild LLP

(57) ABSTRACT

A system processes a set of images to verify whether the images depict a type of property damage, such as hail damage from a hail storm. The system receives digital images of a roof or other facet of the property that were taken by an image capturing device after the storm event. The system also receives storm data relating to the storm event and claim data related to a property damage claim. The system uses the claim data to process the digital images to automatically identify damage to the roof or other facet. The system then analyzes the storm data to determine whether the damage is consistent with an actual, naturally-occurring storm event, and it generates a report depicting its findings.

16 Claims, 7 Drawing Sheets

(56) References Cited

U.S. PATENT DOCUMENTS

| | | |
|---|---|---|
| 8,818,770 B2 | 8/2014 | Pershing |
| 8,825,454 B2 | 9/2014 | Pershing |
| 8,874,454 B2 | 10/2014 | Plummer et al. |
| 8,929,586 B2 | 1/2015 | Brown |
| 8,977,520 B2 | 3/2015 | Stephens et al. |
| 8,995,757 B1 | 3/2015 | Ciarcia et al. |
| 9,002,719 B2 | 4/2015 | Tofte |
| 9,536,148 B2 | 1/2017 | Gross |
| 9,846,915 B2 | 12/2017 | Howe et al. |
| 9,870,609 B2 | 1/2018 | Kompalli et al. |
| 2005/0251427 A1 | 11/2005 | Dorai et al. |
| 2006/0095304 A1 | 5/2006 | Madison et al. |
| 2007/0285537 A1 | 12/2007 | Dwinell et al. |
| 2008/0103841 A1 | 5/2008 | Lewis et al. |
| 2008/0284849 A1 | 11/2008 | Kassem |
| 2009/0063234 A1 | 3/2009 | Refsland et al. |
| 2009/0265193 A1 | 10/2009 | Collins et al. |
| 2009/0276708 A1 | 11/2009 | Smith et al. |
| 2009/0297031 A1 | 12/2009 | Pettigrew et al. |
| 2010/0179787 A2 | 7/2010 | Pershing et al. |
| 2010/0215212 A1 | 8/2010 | Flakes, Jr. |
| 2010/0257477 A1 | 10/2010 | Nielsen et al. |
| 2013/0117078 A1 | 5/2013 | Weik, III et al. |
| 2013/0297353 A1 | 11/2013 | Strange et al. |
| 2014/0032433 A1 | 1/2014 | Eick et al. |
| 2014/0039935 A1 | 2/2014 | Rivera |
| 2014/0079297 A1 | 3/2014 | Tadayon et al. |
| 2014/0149144 A1 | 5/2014 | Li et al. |
| 2014/0278570 A1* | 9/2014 | Plummer ............... G06Q 40/00 705/4 |
| 2015/0348204 A1* | 12/2015 | Daues .................... G06Q 40/08 705/4 |
| 2016/0086285 A1 | 3/2016 | Jordan Peters et al. |
| 2017/0221110 A1 | 8/2017 | Sullivan et al. |
| 2017/0339093 A1 | 11/2017 | Pesavento et al. |
| 2017/0364766 A1 | 12/2017 | Das et al. |

OTHER PUBLICATIONS

Huang H. et al., "Rule-based Roof Plane Detection and Segmentation from Laser Point Clouds", In: Stilla U, Gamba P., Juergens C., Maktav D. (Eds) JURSE 2011—Joint Urban Remote Sensing Event—Munich, Germany, Apr. 11-13, 2011.

El-merabet Y. et al., "Watershed regions and watershed lines based cooperation strategy for image segmentation. Application to roof detection", ISSPIT '11 Proceedings of the 2011 IEEE International Symposium on Signal Processing and information Technology, pp. 393-398.

Bretar F. et al., "Recognition of Building Roof Facets by Merging Aerial Images and 3D Lidar Data in a Hierarchical Segmentation Framework", 18th International Conference on Pattern Recognition (ICPR'06) (vol. 4), Hong Kong Aug. 20, 2006-Aug. 24, 2006.

* cited by examiner

IMAGE ANALYSIS SYSTEM FOR VERIFICATION OF PROPERTY ROOF DAMAGE

BACKGROUND

This disclosure relates to methods and systems that capture images of property damage, process those images, and use the information gathered from the processed images to verify whether a roof of a property has been damaged by various incidents, such as a hailstorm. The verification may be used for purposes such as automated property damage claim verification.

Today, when an owner of a building or other structure experiences property damage resulting from an incident such as hail, wind, lightning, vandalism, or other activity, several steps must occur to remediate the damage. In some situations, the property owner may need to ask a construction contractor to prepare a detailed description and assessment of the damage in order for the contractor to determine what is needed to fix the property. In other situations, the property owner may first need to submit a claim to its property insurer.

Currently, to submit a property damage claim, the property owner first calls the insurance company. Then the insurance company dispatches a claim adjuster to the property. The adjuster manually surveys the property and the damage to it, takes pictures of the damaged area(s), measures the damaged area(s), and takes notes (usually by hand on paper or mobile device) describing the type and extent of the damage. When the damage to the property is on the roof, the adjuster is usually required to climb a ladder and get on or near the roof in order to be able to perform these tasks. The adjuster commonly is carrying a camera, chalk, tape measure and note pad or electronic device for capturing notes. A similar process can apply when a contractor is assessing property damage to determine what is needed to remediate the damage In the case of insurance, the adjuster may enter the pictures, measurements, and notes that he or she captured into a claims processing system. The adjuster makes a determination as to whether the damage was due to a cause that is covered by the insurance contract, and he or she determines (or passes on the appropriate info to the system to determine) the amount that the insurer will pay on the claim. In computing the payment amount, the system may take into consideration the cost of material, labor and factors unique to the property owner's policy (e.g., deductible, depreciation, policy limits, etc.).

This process has several limitations. For example, it is manually time-consuming for the adjuster to perform on-site at the property. Following catastrophic weather events, as the claims volume greatly exceeds the standard adjusting capacity of the typical insurer, there could be delays in inspection, payment and the timely booking of a repair contractor. It is also potentially dangerous to have the adjuster inspect the property, especially if the inspection requires getting on a ladder and/or the roof (and note that this requires that the adjuster be insured to a higher level coverage, which is another cost in the process). Further, in the current property damage claim system, assessment results may not be consistent from adjuster to adjuster. Most of the above drawbacks may contribute to lower customer (i.e., policyholder) satisfaction than likely would be the case if the process were more consistent and efficient. Therefore, the current process for processing a property damage insurance claim can be labor-intensive, costly, slow, and unsafe.

This document describes devices and methods that are intended to address issues discussed above and/or other issues.

SUMMARY

In an embodiment, a system for processing a set of images of a property to identify a type of damage to the property includes a processing device and a computer-readable medium containing programming instructions that are configured to cause the processing device to identify the damage. The system also may include an image capturing device configured to capture the digital images and transmit the captured digital images to the processing device. The system will receive digital images of a facet of a property taken by an image capturing device after a storm event, receive storm data relating to the storm event from a data source, and receive claim data related to a property damage claim of the property from a data source (which may be the same source or a different source than the previous data source). The system will process content of digital images using the claim data to automatically identify content that comprises damage to the facet of the property. The system will analyze the storm data to determine whether the damage is consistent with an actual, naturally occurring storm event, and the system will then output a report indicating whether the damage is consistent with the actual, naturally-occurring storm event.

In some embodiments, when processing the content of the digital images, the system may segment at least one of the digital images into multiple subsections. For each digital image that is to be segmented, the system may: (i) produce an initial edge map by extracting edges from the image, so that at least some of the edges correspond to boundaries of an element of the facet; (ii) use an edge detector to detect a plurality of lines in the image; (iii) determine the top N orientations of the lines, based on those orientations that occur most frequently; (iv) produce an enhanced edge map by adding pixels that are covered by the lines that are oriented in one of the top N orientations to the initial edge map; and (v) fill a group of cells of the enhanced edge map.

For example, the facet may include a roof, the damage may include one or more bruises on one or more roof shingles, and the storm event may include hail. If so, then when processing the content of the digital images and analyzing the storm data, the system may do at least one of the following: (i) identify a location of the property and a size range of the one or more bruises, and determine whether the location of the property and the size range of the one or more bruises are consistent with the storm data; (ii) identify sizes of the one or more bruises and determine whether the identified sizes of the one or more bruises exceed a threshold minimum size that is associated with a hail storm; or (iii) identify a section of the roof on which the one or more bruises occurred, and determine whether the identified section faces a direction from which the storm data indicates that hail was originated.

Optionally, the system may identify additional damage to a facet of the property other than the roof, and determine whether the damage to the roof is consistent with the additional damage to the facet of the property other than the roof. As another option, for any bruise that is on a shingle, the system may determine whether or not granules of the shingle were crushed.

Optionally, when processing the content of the digital images and analyzing the storm data, if the system identifies bruises in the images the system may identify a degree of randomness of the bruises using a histogram of the number of bruises per a unit of surface area, or by determining a size distribution of the one or more bruises. The system may then use the degree of randomness to determine whether the one or more bruises are a result of a naturally-occurring hail event. The system may also calculate a coordinate of a center of each bruise relative to a coordinate system established for a section of the roof on which the bruise appears.

In some embodiments, the storm data may also include corroborating damage data of a neighboring property. If so, then when analyzing the storm data the system may determine whether the damage matches the corroborating damage data of the neighboring property.

BRIEF DESCRIPTION OF THE DRAWINGS

FIG. 7A illustrates a strengthened edge map, while

DETAILED DESCRIPTION

Figure 1:
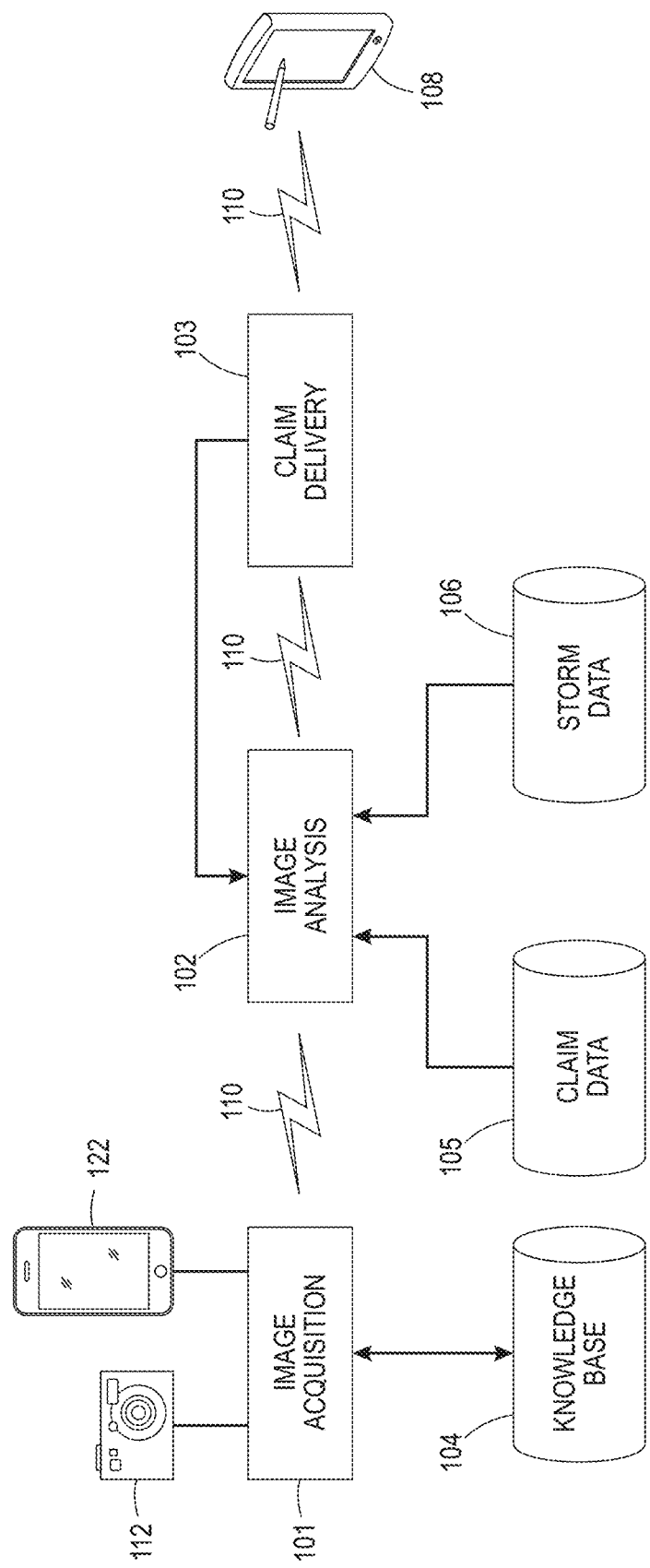
FIG. 1 illustrates a property damage verification system according to one embodiment.

This disclosure is not limited to the particular systems, methodologies or protocols described, as these may vary. The terminology used in this description is for the purpose of describing the particular versions or embodiments only, and is not intended to limit the scope.

As used in this document, any word in singular form, along with the singular forms "a," "an" and "the," include the plural reference unless the context clearly dictates otherwise. Unless defined otherwise, all technical and scientific terms used herein have the same meanings as commonly understood by one of ordinary skill in the art. All publications mentioned in this document are incorporated by reference. Nothing in this document is to be construed as an admission that the embodiments described in this document are not entitled to antedate such disclosure by virtue of prior invention. As used herein, the term "comprising" means "including, but not limited to."

In this document, the term "aerial drone" refers to an unmanned vehicle that uses aerodynamic forces to provide vehicle lift, and that can fly autonomously or be piloted remotely. An aerial drone may also be referred to by those of skill in the art as an unmanned aerial vehicle (UAV), unmanned aircraft system (UAS), a remotely-piloted aircraft (RPA), or simply a drone.

In this document the terms "computer-readable medium," "data storage facility", and "memory" each refer to a non-transitory device on which computer-readable data, programming instructions or both are stored. Unless the context specifically states that a single device is required or that multiple devices are required, the terms "computer-readable medium," "data storage facility," and "memory" include both the singular and plural embodiments, as well as portions of such devices such as memory sectors.

In this document, the term "electronic device" refers to a device or system of devices that include a processor and a computer-readable medium. The memory may contain programming instructions in the form of a software application that, when executed by the processor, causes the device to perform one or more processing operations according to the programming instructions. An electronic device also may include additional components such as a touch-sensitive display device, microphone, keyboard or keypad or other components that serve as a user interface, as well as a camera or other imaging device. An electronic device also may include one or more communication hardware components such as a transmitter and/or receiver that will enable the device to send and/or receive signals to and/or from other devices, whether via a communications network or via near-field or short-range communication protocols. Examples of electronic devices include smartphones, digital cameras, tablet computing devices, aerial drones, personal computers, wearable electronic devices, and the like.

In this document, the term "digital image" refers to any still image and/or set of video images captured and stored as one or more digital data files. Examples include pictures and videos that are captured by a camera or by an electronic device that includes a camera, visible spectrum images, infrared (IR) spectrum images, ultraviolet (UV) spectrum images, three-dimensional images gathered by LIDAR or other systems, images gathered by other remote sensing technologies, and the like. The term "frame" in an image refers to a still or video frame.

In this document, the term "incident" means a physical action that caused damage or other loss to an item of physical property. Examples include a weather incident that damaged a building or vehicle (such as hail, wind, lightning damage or other storm), or a falling object or collision that damaged a building or vehicle. An "incident type" is a descriptor that is used to identify one or more incidents, such as a word, name or code. When this document refers to an incident that damages a "roof" of an object, it means any top section of the structure, such as a roof of a building, or the hood or roof of a vehicle.

In this document, the terms "imaging device" and "image capturing device" refer generally to a hardware sensor that is configured to acquire digital images. An imaging device may capture still and/or video images, and optionally may be used for other imagery-related applications. For example, an imaging device can be held by a user such as a digital still camera, DSLR (digital single lens reflex) camera, cell phone camera, or video camera. The imaging device may be part of an image capturing system that includes other hardware components. For example, an imaging device can be mounted on an accessory such as a monopod, tripod, or "selfie stick." The imaging device can also be mounted on a transporting vehicle such as an aerial drone, a robotic vehicle, or on a piloted aircraft such as a plane or helicopter.

In this document, the term "facet" refers to a physical structure (or portion of a physical structure) that has been constructed on a parcel of real estate. Examples of facets include a roof or side of a building, a patio, a deck, a sidewalk, a driveway, or a fence.

In this document, the terms "processor" and "processing device" refer to a hardware component of an electronic device that is configured to execute programming instructions. The term "processor" may refer to either a single processor or to multiple processors that together implement various steps of a process. Unless the context specifically states that a single processor is required or that multiple processors are required, the term "processor" includes both the singular and plural embodiments.

With reference to FIG. 1, a property damage assessment and verification system is shown by way of example. An image acquisition system 101 captures digital images of the damaged facet(s) of the property via an imaging device 112, and transfers the captured digital images to the image analysis system 102 via a communication link 110. The image analysis system 102 automatically analyzes the acquired images and communicates the property damage assessment results to a claim delivery system 103 via a communication link 110. The claim delivery system 103 communicates the claim results to an electronic device 108 of a relevant party via a communication link 110. The communication links may be separate or common components of a wired or wireless communication system, such as a wire or bus (in a wired system), or transmitter/receiver and/or communication port for use in a near-field, short-range, local-area, wide area, mobile data or other communications network (such as the Internet).

In one scenario, when a property owner believes that her property has suffered damage that is covered by her insurance policy, such as damage to a roof caused by a storm event such as hail, she may initiate the claim process by contacting her insurance company. The insurance company subsequently dispatches an operator, such as an insurance company adjuster, a third-party adjuster, or another party (for instance, a roofing contractor or a drone flying service company) to the property. In one embodiment, the image acquisition system 101 is or includes a portable electronic device that the operator carries, such as a cell phone camera used in handheld mode or mounted to a "selfie stick." In other embodiments, the image acquisition system 101 may include an imaging device 112 mounted to an aerial drone or robotic vehicle, along with a separate controlling electronic device 122 having a wireless transceiver to send control signals to and receive digital images from the aerial or robotic electronic device that contains the imaging device (or these images may be transferred from the aerial or robotic device later via a wired connection).

In some embodiments, the image acquisition system 101 may include a software application that runs on the electronic device to control operation of the imaging device 112. In some embodiments, the image acquisition system 101 includes a user interface (such as a microphone, keyboard or keypad) that can receive input from a user in typed or spoken form, and the software can be configured to receive commentary (voice or text) related to the images as the images are being captured. In one embodiment, the system enables the operator to perform all of the image acquisition actions from the ground and transmit the captured imagery to the insurance company.

In one embodiment, the image acquisition system 101 can include or have access to a knowledge base 104 that stores image acquisition parameters that characterize how the image sensor should operate to capture digital images for a particular property damage category, such as hurricane, hail storm, fire, etc. Examples of these parameters and methods include, but are not limited to, operation of the imaging device in response to various detected lighting conditions that a light sensor may detect (e.g., a command that operates a flash if the detected light level is below a threshold value, a size setting for an adjustable aperture of the imaging device in which the size is a function of the detected light level, a speed setting that determines as a function of the detected light level a speed within which a shutter of the imaging device will open or close, or an ISO setting that determines a sensitivity of the imaging device as a function of the detected light level. Other image acquisition parameters include image sensor positions and orientations. In embodiments where the image sensor is part of an aerial drone, the image acquisition parameters may be a flight path for the drone. The parameters also may include commands to adjust for various other conditions that may be present when the digital images are captured, such as weather conditions or the like.

Image analysis system 102 includes a processor and programming instructions to receive and automatically analyze the acquired images using a set of image processing criteria via computer vision, machine learning, and/or other methods and determine whether to process the property damage claim or deny the claim based on one or more claim processing criteria. The image analysis system 102 may determine whether legitimate, naturally-occurring property damage exists based on whether the damage is consistent with claims processing data 105 and other corroborating data such as storm data 106 (such as weather data, or a date confirming that an event that ostensibly caused the damage actually occurred). The image analysis system 102 may also determine the measurements and other data necessary to compute the amount of the claim payment. Alternatively and/or additionally, the image analysis system 102 may also generate a request for some or all of this data from other systems or providers if the data is inconclusive or unavailable. In some embodiments, the image analysis system 102 may also send some or all data necessary to compute the amount of the claim and send it to all downstream systems and parties involved in processing the claim. Various components of the image analysis system may operate autonomously, or the system may operate semiautonomously with some human input or intervention.

Claim delivery system 103 communicates with other parties involved such as an insurance provider and includes a transceiver or communication port that can send data via a communication link, whether wired or wirelessly, and deliver the final disposition as to whether a claim is valid based on a determination that property damage occurred from a naturally-occurring event. It may pass along, or request the generation of, and deliver all data and measurements necessary to allow for the computation of the claim amount.

In some embodiments, the system may take a machine learning-based approach. In one embodiment, the system may use a supervised or a semi-supervised approach. Both the supervised and semi-supervised approaches require a training stage and an inference stage. In the supervised approach, the system may categorize the roof images of the damaged property into "naturally occurring" (i.e., caused an act of nature such as a storm) and "not naturally occurring" (i.e., caused by human activity). Additionally, the system may use additional categories, such as "no damage," "manufacturing defect" or "foot scuff marks." The system may use a classifier, or a combination of classifiers, such as a support vector machine (SVM), a decision tree, a nearest-neighbor classifier, a convolutional neural network or any other known or later developed classifier. The system may develop or collect labeled data corresponding to those categories and train the classifier using a feature representation in some chosen feature space. The labeling may be done by a trained professional in advance using a corpus of imagery. The features may include attributes such as size, shape, density, location or similarity of detected hail strikes, as well as the texture, color, and the like or a combination thereof extracted from both the damaged and undamaged portion of the roof. The system also may learn the features using a deep learning framework or a discriminative analysis process. The inference stage may take an "unseen" roof image of a property and use the learned classifier to determine what category the input image belongs, whether "naturally occurring," "not naturally occurring" or any of the additional categories.

In one embodiment, the system may use a semi-supervised approach, under which the system can build a statistical model. This approach may use the same feature space as in the supervised approach. However, it may be advantageous when, which is often the case, imagery of non-naturally-occurring damage is more difficult to obtain than imagery of naturally occurring damage. The model may be developed to describe the statistical behavior of features corresponding to images of roofs with natural damage and can be in the form of a cluster or a probability density function. Once the model is built, the system may receive an "unseen" roof image and extract the same set of features as used in the training. The system may then compute the deviation of the input image from the model based on a measure, for example, via a likelihood test or via the use of a distance metric. If the amount of deviation of the input image is larger than a threshold, the system may determine that the roof in the input image is assigned to the non-naturally-occurring damage category.

In another embodiment, the system may use an unsupervised approach, which can be advantageous when labels for the corpus of imagery are not available. In other words, the unsupervised approach does not require a training stage. The system may extract features from each received input image and identify patterns of behavior of the input data, and then separate the data into the naturally occurring damage category, the not naturally occurring damage category, or one or more additional categories using a classifier that is trained on the extracted features. In one embodiment, an expected percentage of imagery corresponding to fraudulent damage can be input as a parameter to the classifier, and the system may categorize each received input image based on the expected percentage (i.e., a prior). For example, a low expected percentage may indicate that the samples reflecting non-naturally-occurring damage correspond to a minority of the data.

Figure 2:
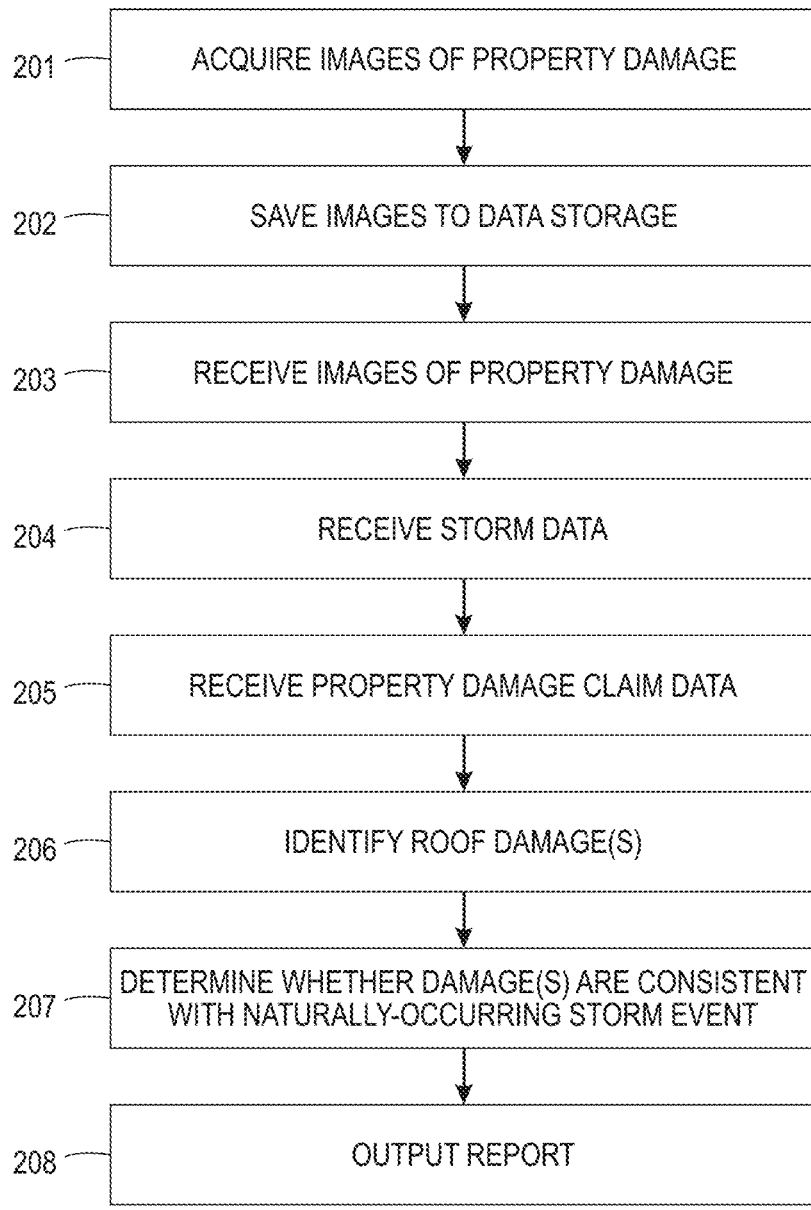
FIG. 2 illustrates an example of a process of using automated image analysis to detect non-naturally-occurring damage in relation to a storm event according to one embodiment.

A property damage verification system is further described in detail, with reference to FIG. 2. The system may receive digital images of damage to one or more facets of a property 203 related to a storm event or other incident, such as roof images related to a hail storm. In some embodiments, an image sensor may acquire digital images of the property and its damaged facet(s) 201 and save the digital images to a data storage facility 202 for use by the system, while in other embodiments the system may receive the digital images from another system.

In one embodiment, the system may also receive, from a data source such as a data storage facility or external system, claim data that contains parameters of the property and/or a claim filed relating to storm damage on the property 205, as well as data about the storm event or other incident 204 that allegedly caused the damage to the property. The claim data may include details about a type of storm event that allegedly occurred, as well as parameters and instructions for image processing to determine whether the images depict damage of a type that would be expected from the storm event. The system can use the storm data to verify whether the storm event actually occurred, and/or to measure an intensity of the storm (such as an expected hail size range). Examples of storm data include weather service data, news reports, or other corroborating data about damages to other properties in a geographic vicinity of the property.

In one embodiment, the system may use the claim data to analyze images of the property to identify whether the images depict one or more damages 206 that are expected to occur from a storm event of a type that is associated with the claim. For example, the system may analyze roof or facet images of a property captured after a hail storm and identify bruises that are shown on the roof tiles or facet elements. Hail damage, as it manifests itself on an asphalt shingle roof, is a random pattern of visible impact sites (referred to in this document as "bruises") to the shingles themselves. The size and depth of each bruise, and the resulting damage inflicted to the shingles (and, in extreme cases, to the decking and other building materials below the shingles) by each hail stone depends on a number of factors such as the quality, the type, the thickness, the number of layers and the age of the shingles themselves. The damage may also depend on the size, the shape, the density and the velocity of the hail stone (hence its kinetic energy & hardness). The damage may also depend on the angle between the velocity vector of the hail stone and the direction that a normal (i.e., perpendicular) points from the surface of the facet or roof section which the hail stone impacts (with the damage getting more severe the more parallel these two vectors are).

Figure 3:
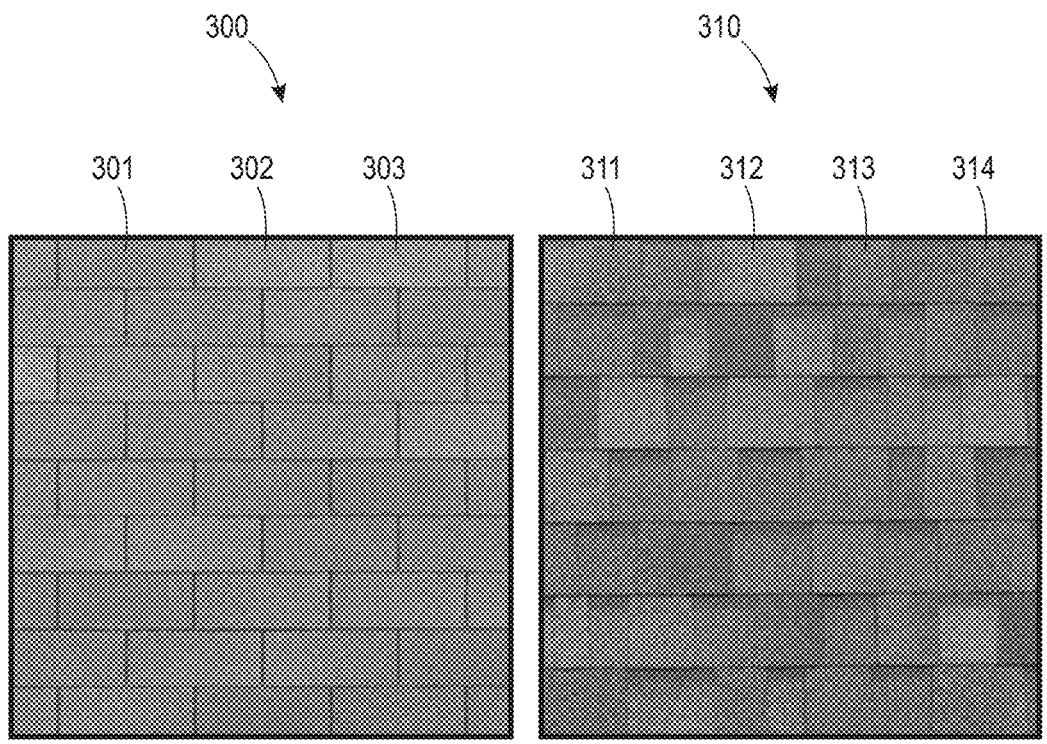
FIG. 3 illustrates examples of shingle types as exist in the prior art.

Asphalt is a common residential roofing material. While this disclosure is not limited to facets, roofs or roofs with asphalt compositions, asphalt composition and other roofs include two common types (as illustrated in FIG. 3): (1) traditional, "three tab" shingles 300 in which each shingle includes three connected tabs 301-303 (these shingles are generally less expensive); and (2) "architectural" or "laminated" shingles 310 in which the side edges of each tab 311-314 are cut at varying slightly-off-vertical angles so as to attempt to give the roof the look of a real wood shake roof (resulting in shapes that look somewhat like "teeth"). Damage to the shingles may be classified in at least two ways: "cosmetic" damage and "functional" damage. "Cosmetic" damage occurs when some (but not all) granules may be removed in the area of the bruise, resulting in a visible mark, but with no long-term deterioration in the life of the shingle or its ability to protect the structure of the property. "Functional" damage occurs when enough granules are removed to expose the underlying asphalt, and/or the paper or fiberglass mat inside the shingle is fractured. In general, hail stones of about 1 to about 1¼ inches in diameter and larger are capable of causing functional damage to asphalt composition shingles.

To identify whether property damage resulted from a hail storm, in one embodiment the system may analyze digital images of the property, identify whether the images depict one or more bruises, and identify one or more parameters of the bruises (such as bruise size, or an effect that the bruise caused to the property). For example, the system may identify the size of a bruise. If a bruise is on a shingle, the system may determine whether or not the shingle's granules were crushed. The system may also determine which property the bruise is on and which specific part of the property the bruise is on. For example, the system may identify whether the bruises are on the roof, one or more side(s) of the structure, one or more roof protuberance(s), one or more gutter(s), the flashing, one or more air conditioning unit(s), one or more vent(s), or one or more vehicle(s), or one or more vehicle sections (e.g., roof, windshield, hood, deck, side mirror(s), etc.). The system may also identify damages to the landscaping, other vegetation, or damages on neighboring properties. The system may also determine which direction(s) the specific part(s) of the property face and which part(s) (have) bruises on them. In various embodiments, this orientation may be represented in a two-dimensional (2D) or three-dimensional (3D) space.

In one embodiment, if one or more bruises are identified to be on the facet or the roof, the system may identify roof damage at various segments (referred to as levels) of the roof. For example, the system may identify roof damage at tab/tooth level—meaning that the system may identify whether there is damage somewhere on the tab/tooth of a shingle, along with coordinates of the tab/tooth and the direction its section of the roof faces. In another example, the system may identify roof damage at "section" level—meaning that the system may identify whether there is damage somewhere on a section of the roof, along with coordinates of the section and the direction the section faces. Alternatively and/or additionally, the system may identify coordinates of the center of the bruise relative to a coordinate system established for the tab/tooth or section of the roof.

In another embodiment, the system may analyze roof images and determine whether the roof is at least partially blocked by large trees or vegetation, or any structures that would have blocked or slowed down natural hail before it reached those areas.

With further reference to FIG. 2, the system may determine whether the parameters of the property damage, such as the bruises, are consistent with parameters that are known to be associated with a naturally occurring event 207, such as a hail storm. In one embodiment, if the damage patterns that are not consistent with patterns of damage that are expected to be caused by a natural hail storm or by other legitimate causes of damage (such as shingle manufacturing defects, installation defects, or mechanical wear due to normal causes), the system may determine that the insurance claim relates to non-naturally-occurring damage and generate a report that contains such a finding 208. In various embodiments, the report may be an alert, a record of data, or another communication that informs a person or system that the finding exists and/or about details of the finding.

In determining whether the damage pattern is consistent with a naturally occurring event 207, it is noted that the damage pattern of a natural hail storm exhibits various characteristics such as: the location, the extent, the direction of motion, the timing, the dwell times, the severity, and other parameters of the storm as it evolves. These various characteristics of the storm can be mapped over time by various government agencies, private companies, and other entities. Among other things, the resulting storm track and contours paint a picture of where given degrees of storm severity occurred, in what direction, and when. In one embodiment, the system may determine whether the location of a property and the size range of bruises on it are consistent with the storm data. This could be done by taking the coordinates or address of the property, placing it on a contour map of the storm's hail size, looking up what size range of hail actually fell at that location (according to the storm data source), and comparing the sizes of the bruises observed on the property to those from the storm data. If the system identifies a larger level of deviation between these two ranges, it may determine that the damage to the property is potentially a result of something other than a naturally occurring storm event. In one embodiment, when comparing the sizes of bruises, the system may take into account that differing surfaces have different-sized bruises for a given size and kinetic energy of hail.

Alternatively and/or additionally, the system may compare the actual sizes of the bruises to a known threshold above which natural hail damage is likely to occur. For example, according to the statistics, the threshold may be about 1 to 1¼ inches in diameter. If the actual sizes of the bruises are mostly below the threshold, the system may determine that property damage is potentially not a result of naturally occurring hail. Additionally, the system may adjust the threshold based on what type of shingles are on the roof, what brand and/or quality of shingles are on the roof, how many layers of shingles are on the roof, the age of the shingles, the density of the hail, etc.

Alternatively and/or additionally, the system may compare the facing directions of the sections of the facet or the roof (and possibly other parts of the subject property) that are damaged to the direction that the storm progressed. In one embodiment, the system may calculate the facing direction of the sections of the roof by averaging those sections of the roof that had substantial damages, which may be measured by the number of bruises per unit roof area, or the total bruise area per unit roof area. If the number of bruises per unit roof area or the total bruise area per unit roof area exceeds a threshold, the sections of the roof on which the bruises exist will be counted towards the calculation of average direction. If the angle between the facing direction of the sections of the roof and the direction the storm travels is about 180 degrees, the system may determine that it is more likely that the damage was from the storm as this would indicate that the most severely-damaged sections of the roof did, in fact, face into the oncoming storm.

Alternatively and/or additionally, the system may assess portions of the property other than the roof, and check the consistency between the damage to the roof and the damage to other portions of the property. For example, the system may compare the roof damage to damages on the side(s) of the structure, roof protuberance(s), gutter(s), the flashing, air conditioning unit(s), vent(s), vehicle(s), the landscaping or other vegetation, or on neighboring properties. If the damages to the roof shingles, facet elements, and those to other portions of the property (or neighboring property) are not consistent, for example, the facing directions as determined from the damages are substantially different, the system may determine that it is likely that the property damage is not consistent with a naturally occurring storm event.

Alternatively and/or additionally, the system may examine the damage pattern and determine how random it is. For example, the system may examine the bruise locations and sizes on each section of the roof. In one embodiment, the system may divide each section of the roof into equal sub-areas and then calculate a histogram of the number of bruises per sub-area. The sub-area may be a tab or tooth, or a larger area. In one embodiment, the system may determine whether the shape of the histogram follows a Poisson distribution by calculating the chi-squared goodness of fit test to the Poisson distribution (that distribution being what is expected for a "random" process such as natural hail). The system may use the chi-squared goodness of fit statistic to quantify whether a damage pattern deviates from "pure randomness," i.e., if the chi-squared goodness exceeds a threshold, the system may determine that the property damage is not consistent with a naturally occurring storm event.

In determining the randomness of a damage pattern, the system may also examine the size distribution of bruises on the roof or facet and compare that with the range of sizes one would observe from a natural hail storm. The system may determine whether there is a "tight" uniformity in the sizes of the bruises that may be indicative of a deviation from randomness. This is based on the assumption that any artificially made bruises by someone hammering on the roof tend to be uniform in size. The system may also identify any unnatural clustering of the bruises near or away from the edges of the section of the roof, or any unnatural clustering near or away from the edges of each tab or tooth, or any discernable patterns other than those caused by natural, random variability. For example, if the size range of bruises on a roof is smaller than what would be observed from natural damage-causing hail, the system may determine that the property damage is not consistent with a naturally occurring storm event. In some embodiments, in addition to considering a threshold minimum size that is expected to be a hail-related bruise, the system also may include an upper size threshold, such that if the size distribution is above the threshold, the system may consider the bruises to be man-made or something other than a naturally-occurring storm event.

Alternatively and/or additionally, the system may analyze the image of each shingle bruise to determine if the granules were crushed or not. It can be noted that a hail storm might displace shingle granules in the vicinity of the bruise but it will not crush them or pulverize them into powder. This is because the granules themselves are harder than the ice that composes the hail. If the system identifies that granules in the vicinity of the bruise are crushed, the system may determine that it is much less likely that the cause of the damage was a natural hail storm.

Figure 8:
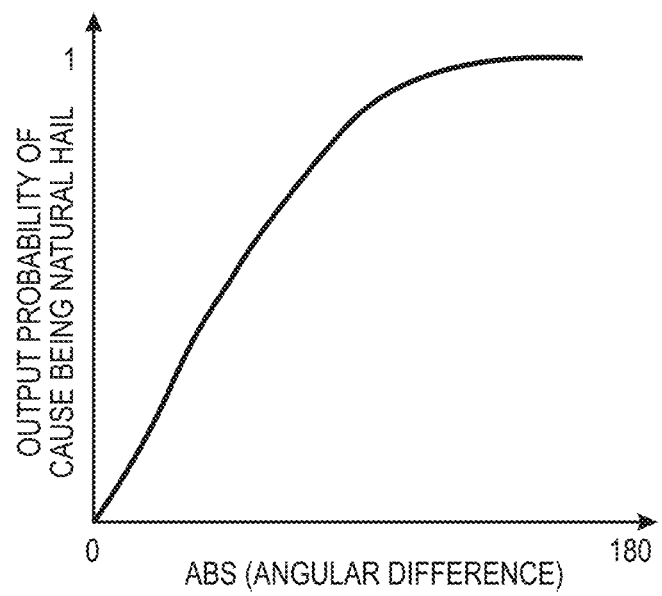
FIG. 8 illustrates an example of non-linear mapping for identifying damages according to one embodiment.

There are various ways the system may utilize the above disclosed determinations. In one embodiment, the system may, for each determination, generate a probability score between 0 (not at all consistent with a natural storm) and 1 (fully consistent with a natural storm), and combine the scores from all determinations to yield a final probability that the damage is consistent with a natural storm or the property damage is legitimate. The system may generate a binary probability score (either 0 or 1) or a value in the range of (0, 1) for each determination. For example, the system may use a look-up table (LUT) or graph to obtain the probability value. For instance, in comparing the facing direction of the sections of the roof and the direction the storm was traveling, measurement error associated with either or both of those constituent directions might suggest that a delta "near" 180 degrees should be treated the same as one of exactly 180 degrees. In this case, the LUT or graph might be a non-linear mapping, as shown in FIG. 8, as an example. The system may create similar LUTs or graphs for all other damage determinations disclosed above.

In one embodiment, the system may combine the various probability scores for each damage determination using known or later developed fusion techniques. For example, the system may combine the probability scores by straight averaging or weighted averaging. The weights may be obtained by the system through experimentation or training.

In some embodiments, the system may perform image segmentation, which is essentially "zooming in on" or "custom cropping" the images of the property such that one or more portions of the image that need to be analyzed are identified and separated out as individual portions of the image. In the case where the part of the property that is ostensibly damaged is a shingled roof, this segmentation may be done at the various levels, such as: separating the roof from all other elements of the frame, segmenting each individual (and usually, but not always) planar section of the roof, or segmenting each shingle tab or "tooth."

Image segmentation is primarily the task of partitioning an image into segments. These segments can both be used to assist a human reviewer with visualization or analysis, or each partitioned region can be passed on to other algorithms for further processing. In the context of automated roof damage assessment, some level of "tab" and "tooth" segmentation may be useful to facilitate tasks such as pixel-level damage localization.

Figure 5A:
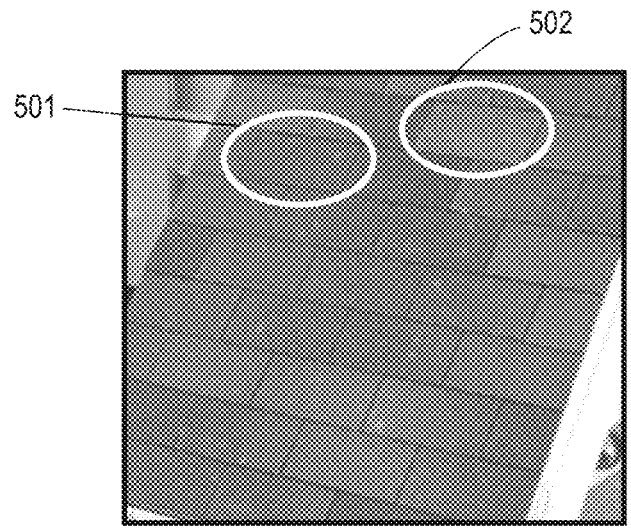
FIGS. 5A and 5B illustrate image segmentation according to various embodiments.

In a non-limiting example, with reference to FIG. 5A, an image of a section of a roof that has been subject to hail damage, is shown. In one embodiment, the system may automatically identify a damaged area by relying on determining differences between an image of the region of the roof being tested and its surroundings. For example, a bruise in the tab with damage 501 may appear brighter or darker in intensity to the camera than its immediate neighbors within the same tab. However, it is also apparent that the delta in brightness between tabs (e.g., tabs 501, 502) is significant, and sometimes even larger than the delta in brightness between damaged and undamaged portions. Such appearance variability across undamaged portions of different tabs will hinder the process of segmenting damaged and undamaged regions based on the differences in brightness. The use of "brightness" in this context is only by way of example, when the image is captured by a camera using visible light. Other measurable parameters may be used, for example with images captured using other imaging modalities such as infrared, ultraviolet, hyperspectral, LiDAR and other imaging systems.

Figure 4:
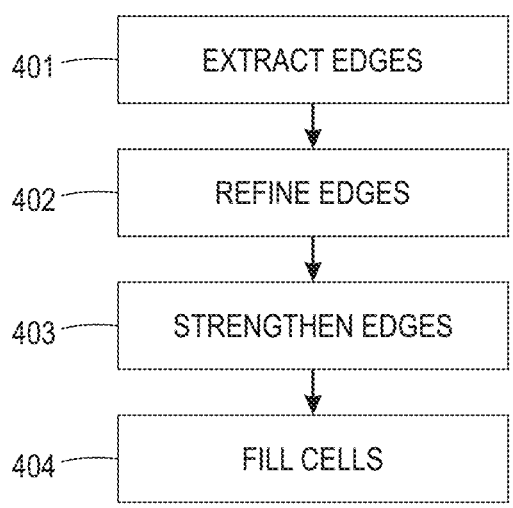
FIG. 4 illustrates an example of image segmentation according to one embodiment.

With further reference to FIG. 4, a method for "tab" and "tooth" segmentation is shown, as an example. Extracting edges 401 performs edge detection on the image and attempts to find the boundaries located at the edges of each roof tab or tooth. The output of this step is an edge map that gives a label for each pixel of the original image. The label denotes whether the pixel is an edge pixel, for example, 1 denotes an edge pixel and 0 denotes that it is not. Refining edges 402 takes the edge map as input and determines a consensus on the predominant orientations of the edges in the image. Properly refined edges should roughly align with the "grid-like" layout of the tabs or teeth of the roof, and produce lines that are approximately aligned with the two predominant orientations. Strengthening edges 403 takes as input the edge map from edge extraction 401 as well as the detected lines from refining edges 402. Pixels that are covered by these lines are added to the edge map, i.e., the label for each pixel location that falls within each line is changed to that of an edge pixel (e.g., 1). The output of strengthening edges is a strengthened edge map. Cell filling 404 provides a new label to each pixel in the image that denotes which tab or tooth it is a part of. The output of this stage is the segmentation map.

Figure 5B:
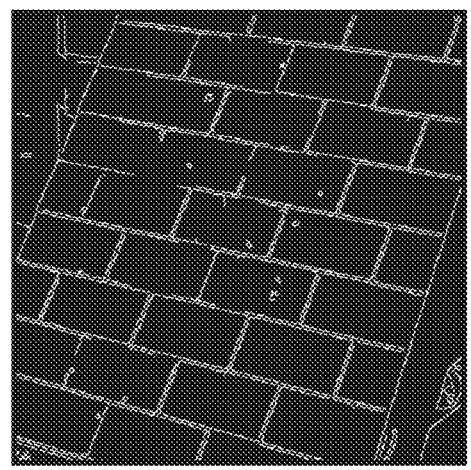

The above disclosed steps of FIG. 4 in image segmentation will be further explained and illustrated in more detail below by way of example. In one embodiment, the system may extract a set of lines (edges) 401 from the roof images of a property using known methods such as the Sobel-Feldman operator, the Canny edge detector and the Laplacian of Gaussian operator. The system may also use other known edge detectors or later developed edge detectors. In a non-limiting example, the system may use a Canny edge detector method to find an initial set of edges. Note that the Canny edge detector requires a sensitivity threshold T that uses the magnitude (or edge strength) of the edge value to determine if it remains an edge. All edges that are greater than T are then stored in an edge map E. This threshold can either be defined by hand or based on training images that allow ground-truth performance to be measured (i.e., compared manually labeled edges with those estimated at different values of T). In general, when T is large, the edges must be stronger, and when T is small weaker edges are detected. Note that the strength of an edge is generally defined by the differences in pixel intensity within a neighboring region at a specified orientation. In an example, the result of the Canny edge detection is shown in FIG. 5B.

Figure 6:
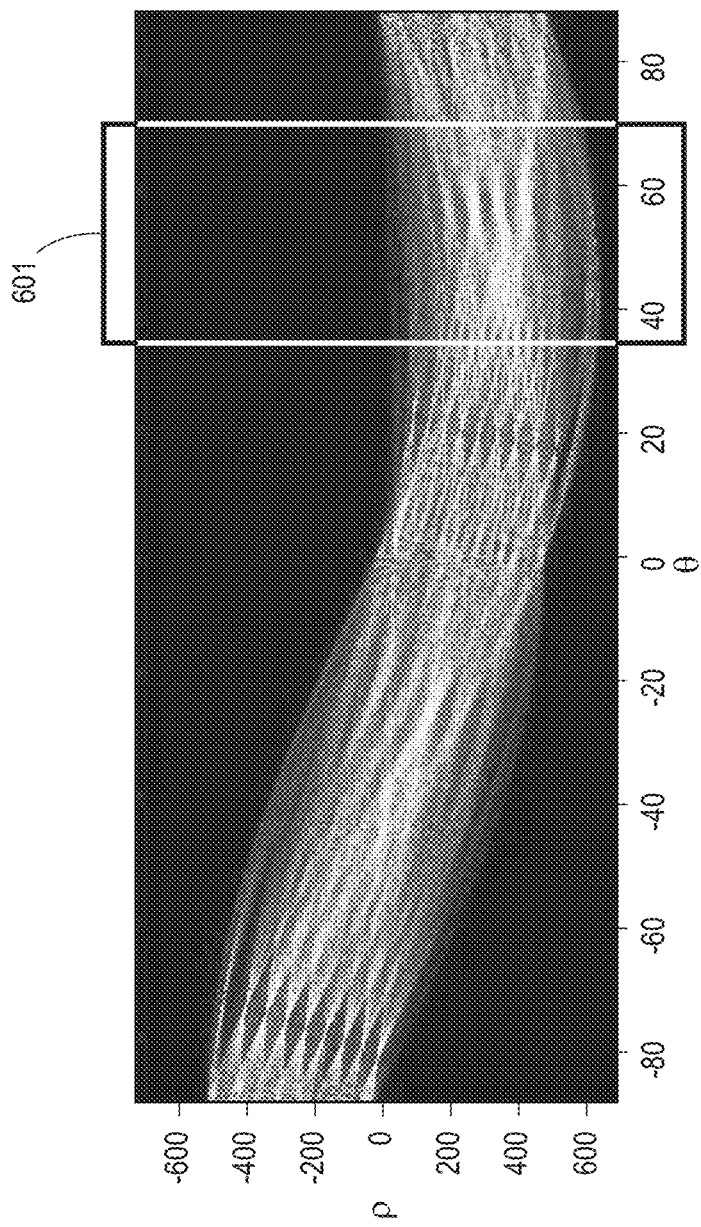
FIG. 6 illustrates the segmented images of FIGS. 5A and 5B in Hough parameter space.

In adverse image acquisition conditions including uneven lighting, specularity, and camera distortions, as well as the varying texture of the roof, the boundaries of each tab may not be completely detected using the edge detection methods used in extracting edges (401 in FIG. 4). This can result in holes or gaps in the edges along the boundary of each roof tile, as shown in a portion of FIG. 5B. To fill up the gaps in the edge images, according to one embodiment, the system may refine edges (402 in FIG. 4) in two steps. First, the system may detect multiple edge points that can be connected to form lines using any known or later developed approaches for detecting lines (or any shape in general) such as the generalized Hough transform. In general, the method works by parameterizing a shape of interest (in this case, lines), then accumulating the votes based on the response of an edge map at a range of parameters. When detecting lines, the method creates a parameter space consisting of an angle θ (the angle of the vector from the origin perpendicular to a given line) and a length ρ (the distance between the line and the origin). The value at the index of the parameter space at (θ, ρ) is incremented when an edge pixel is found at coordinates (x, y), for any pixel in E. Hence, large values, such as brighter regions 601 in FIG. 6 correspond to values of (θ, ρ) that indicate where a line is found in E. Note that θ ranges in the range [−90°, 90°].

An edge refining process (402 in FIG. 4) may be performed by detecting lines that correspond to a set of N highest peaks (i.e., predominant orientations)). The choice of N can be determined by the nature of images that are being analyzed. In the case of roof images with standard three-tab shingles that form a "checker-board" like grid, the system may choose N to be 2. For other roof images, such as those of architectural shingles that often have irregularly shaped grids/cells, the system may use a larger value for N. In one embodiment, the system may use one of the standard peak detection techniques, such as local maxima detection. In another embodiment, the system may use other known or later developed peak detection techniques. FIG. 4C shows an example of the histograms containing the distribution of line orientations (θ is given along the x-axis).

Figure 7A:
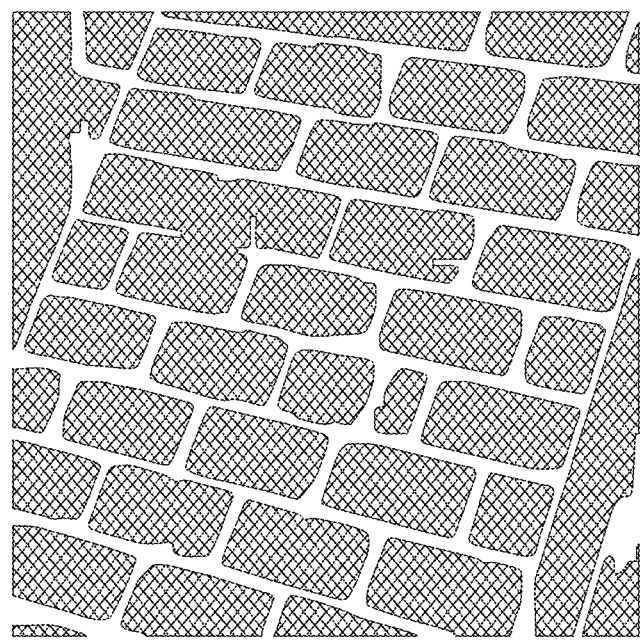

In strengthening edges (403 in FIG. 4), the system may add surrounding lines near the original edges to form a strengthened edge map. In one embodiment, the system may select the largest N peaks (for example, from the result of Hough transform) and accept all lines oriented within an absolute angular deviation r around each peak. Note that depending on the peak location, this radius may wrap around to the other side of the range. For example, given a peak at 89 degrees and an absolute angular deviation r=10, the range of lines that would be considered would be those that are less than or equal to −81 degrees and greater than or equal to 79 degrees. The system may produce an enhanced (or strengthened) edge map $E_s$ by adding pixels that are covered by the lines that are oriented in one of the top N orientations to the initial edge map E. An example of an enhanced edge map is shown in FIG. 7A.

Figure 7B:
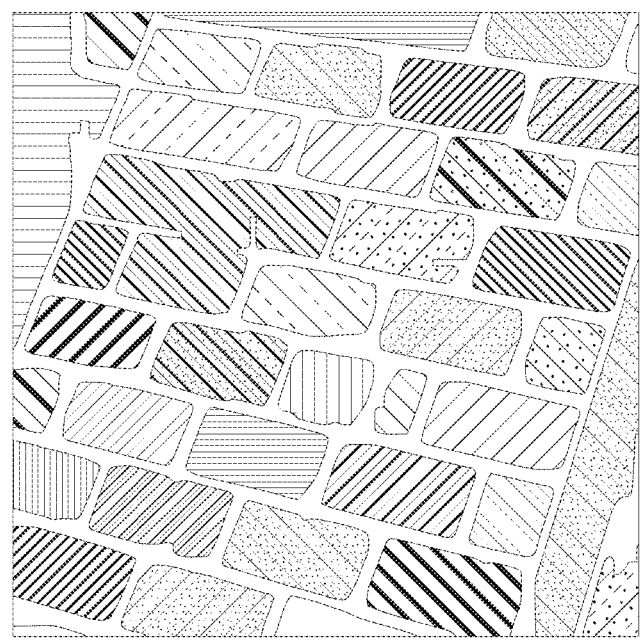
FIG. 7B illustrates the edge map after cells are filled.

In cell filling (404 in FIG. 4), the system considers a cluster of adjacent pixels to be a cell. A cell may be made up of any number of connected pixels so long as no pixel is part of more than one cell. Each cell will have at least one boundary (edge) that it shares with one or more adjacent cells. The system may perform image filling by assigning all pixels within a given cell a unique (i.e., cell-specific) label, or by assigning groups of connected edge (boundary) pixels and/or non-edge pixels for each cell in $E_s$ a unique (cell-specific) label. The system can then use these labels to mask out and separate each roof tile to produce a "tab" and "teeth" segmented image. An example is shown in FIG. 7B (in which, for visualization purposes, each label is assigned a different type of cross-hatching). In one embodiment, the system may not necessarily assign an edge pixel to a cell label. Instead, the system may label edge pixels as belonging to an edge class. In another embodiment, the system may assign every edge pixel to a cell class on a nearest-neighbor or other basis.

While segmentation of images may not perform perfectly due to the variations of color and texture of each shingle, a non-perfect, or partial segmentation may still provide critical cues to the orientation of the camera (or other imaging device) with respect to the roof, and can also assist in overall roof localization. This is well within the scope of this disclosure since one of the main motivations for the roof segmentation is to assist further processing such as damage localization or the detection of non-naturally occurring damage as discussed above.

Further, as can be apparent to one ordinarily skilled in the art, some of the methods in image segmentation are optional and the sequence of methods implemented by the system can vary. For instance, a roof edge map may be sufficient to identify bruises resulting from a hail storm without needing the steps of refining edges, strengthening edges or filling cells. In another example, if a classification-based system is used, then the system may require labeled images but may not need to perform image segmentation.

In addition, the image segmentation methods described above can be applied to images of facets of property features other than a roof. Examples of facets other than a roof include a side (e.g., a brick wall, or a side covered with vinyl or aluminum siding); a patio, sidewalk, walkway or driveway made of a repeating pattern of bricks, stones or slabs; a deck made of panels or planks of deck material; a fence containing fence posts and/or lattice panels; or other structural or decorative features. So long as the images of the facets contain dominant edge orientations, which may happen in images that contain a recurring pattern, as roof tiles, brick walls, siding, fence posts, or other facets of a building or other structure on the property, the aforementioned segmentation methods can be applied. For example, the system may use the methods described above to segment images to correspond to bricks of a brick wall, boards of vinyl or aluminum siding, or other features that have a repeating pattern.

Returning to FIG. 1, the above embodiments can be configured in any variation as would be apparent to one ordinarily skilled in the art. For example, image acquisition may be used by one of a number of envisioned parties beyond the current insurance company or third-party adjusters. In another variation, when a property owner believes that his property has suffered damage that is covered by his insurance policy, he may go directly to another party, e.g., a roofing contractor or a drone flying service, who dispatches an operator, or he may operate the device himself. In another embodiment, any of the above actions in the system could be performed by a user, as appropriate, to enhance the accuracy of the claim results.

In another variation, a contractor goes door to door in a neighborhood, one which was in or near the path of an incident (e.g., a storm) that potentially caused damage, and tells the property owners that they have sustained property damage and that they should contact their insurance company to file a claim. The contractor may also capture one or more images of property related to the incident using the image acquisition system 101 and transmit to the property owner one or more images that he claims is about the damage sustained by the property of the owner. The property owner may initiate a claim by contacting the insurance company by sending in the imagery that was captured by the contractor. In another embodiment, the property owner may "self-serve" by acquiring images of the damaged part of his property using the image acquisition system 101. For example, the property owner may access or download the image acquisition system 101 in the form of software application on a mobile platform and use the property owner's own image capturing equipment, such as an imaging sensor on a camera, a mobile phone, a drone or other mobile devices.

Upon receiving the property owner's claim, the insurance provider may choose to use the images sent by the property owner for claim processing. Alternatively and/or additionally, the insurance provider may decide to collect images on its own, and use the image acquisition system 101 to acquire imagery using an image capturing device (possibly including an aerial drone). Other variations may be possible.

In another variation, the image analysis system 102 may detect non-naturally-occurring damage while the image acquisition 101 is in operation, and the system may choose to immediately deny the claim, generate a recommendation to deny the claim, or generate a report that flags the claim for further review by halting the image acquisition 101 via a communication link 110. In another embodiment, the image analysis system 102 may complete the image acquisition 101, detect that the claim relates to non-naturally occurring damage and choose to deliver information about the non-naturally occurring damage, via a communication link 110, to the receiving party. Other variations may also be possible as would be apparent to one ordinarily skilled in the art.

Figure 9:
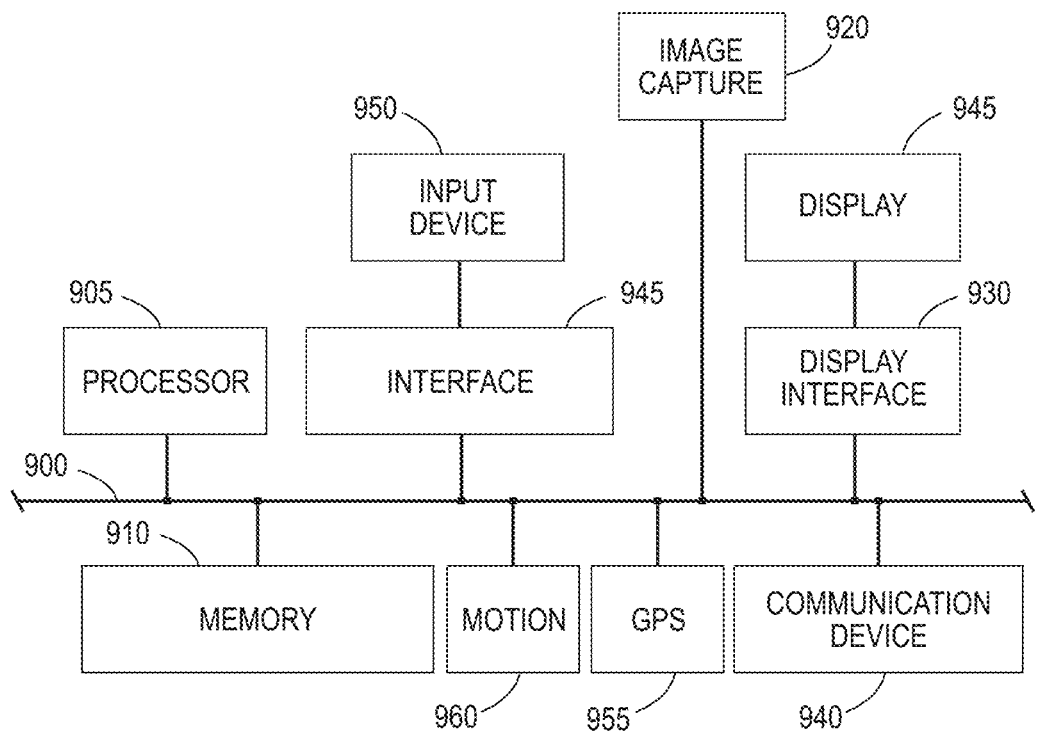
FIG. 9 depicts various embodiments of one or more electronic devices for implementing the various methods and processes described herein.

FIG. 9 depicts an example of internal hardware that may be included in any of the electronic components of the system, the user electronic device or another device in the system. An electrical bus 900 serves as an information highway interconnecting the other illustrated components of the hardware. Processor 905 is a central processing device of the system, configured to perform calculations and logic operations required to execute programming instructions. As used in this document and in the claims, the terms "processor" and "processing device" may refer to a single processor or any number of processors in a set of processors. Read only memory (ROM), random access memory (RAM), flash memory, hard drives and other devices capable of storing electronic data constitute examples of memory devices 910. A memory device may include a single device or a collection of devices across which data and/or instructions are stored.

An optional display interface 930 may permit information from the bus 900 to be displayed on a display device 945 in visual, graphic or alphanumeric format. An audio interface and audio output (such as a speaker) also may be provided. Communication with external devices may occur using various communication devices 940 such as a transmitter and/or receiver, antenna, an RFID tag and/or short-range or near-field communication circuitry. A communication device 940 may be attached to a communications network, such as the Internet, a local area network or a cellular telephone data network.

The hardware may also include a user interface sensor 945 that allows for receipt of data from input devices 950 such as a keyboard, a mouse, a joystick, a touchscreen, a remote control, a pointing device, a video input device (camera) and/or an audio input device (microphone). Data also may be received from an imaging capturing device 920 such as a scanner or camera. A GPS or other positional sensor 955 (e.g., gyroscope) and motion sensor 960 (e.g., accelerometer) may be included to detect position and movement of the device.

The above-disclosed features and functions, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

The invention claimed is:

1. A system for processing a set of images of a property to identify a type of damage to the property, the system comprising:
    an image capturing device;
    a processing device; and
    a computer-readable medium containing programming instructions that are configured to cause the processing device to:
        receive a plurality of digital images of a facet of a property taken by the image capturing device,
        receive, from a data source, storm data relating to an actual, naturally-occurring storm event,
        receive, from a data source, claim data related to a property damage claim of the property, wherein the claim data comprises data identifying the actual, naturally-occurring storm event,
        process the plurality of digital images using the claim data to automatically identify content that comprises damage to the facet of the property, wherein:
            the instructions to process the digital images comprise instructions that are configured to cause the processing device to segment at least one of the digital images into a plurality of subsections; and
            the instructions to segment at least one of the digital images comprise instructions that are configured to cause the processing device to, for each digital image that is to be segmented:
                produce an initial edge map by extracting a plurality of edges from the image, so that at least some of the edges correspond to boundaries of an element of the facet,
                apply an edge detector method to detect a plurality of lines in the image,
                determine a top N orientations of the lines, based on those orientations that occur most frequently in the image,
                produce an enhanced edge map by adding pixels that are covered by the lines that are oriented in one of the top N orientations to the initial edge map, and
                fill a plurality of cells of the enhanced edge map; and
        analyze the storm data and the content that comprises damage to determine whether the damage is consistent with the actual, naturally-occurring storm event by, for each of the digital images, doing one or more of the following:
accessing a trained model that represents statistical behavior of certain features corresponding to images of facets with actual damage, extracting features from the digital image, and computing a deviation of the features extracted from the digital image from features of the trained model; or
extracting features from the digital image, and using a classifier that has been trained on features corresponding to the extracted features to classify the digital image as associated with either naturally occurring damage or not naturally occurring damage, and
output a report indicating whether the damage is consistent with the actual, naturally-occurring storm event.

2. The system of claim 1, wherein:
the facet comprises a roof;
the damage comprises one or more bruises on a roof shingle; and
the storm event comprises a hail event.

3. The system of claim 2, wherein the instructions to analyze the storm data and the content that comprises damage to determine whether the damage is consistent with the actual, naturally occurring storm event further comprise instructions to do at least one of the following:
identify a location of the property and a size range of the one or more bruises, and determine whether the location of the property and the size range of the one or more bruises are consistent with the storm data;
identify sizes of the one or more bruises and determine whether the identified sizes of the one or more bruises exceed a threshold minimum size that is associated with a hail storm; or
identify a section of the roof on which the one or more bruises occurred, and determine whether the identified section faces a direction from which the storm data indicates that hail originated.

4. The system of claim 2, wherein the instructions to analyze the storm data and the content that comprises damage to determine whether the damage is consistent with the actual, naturally occurring storm event further comprise instructions to do at least one of the following:
identify additional damage to a facet of the property other than the roof, and determine whether the damage to the roof is consistent with the additional damage to the facet of the property other than the roof; or
for any bruise that is on a shingle, determine whether or not granules of the shingle were crushed.

5. The system of claim 2, wherein the instructions to analyze the storm data and the content that comprises damage to determine whether the damage is consistent with the actual, naturally occurring storm event further comprise instructions to:
identify a degree of randomness of the bruises by creating a histogram of the number of bruises per a unit of surface area and quantifying whether a damage pattern of the histogram exceeds a randomness threshold; and
if the damage pattern exceeds the randomness threshold, determine that the one or more bruises are a result of a naturally-occurring hail event.

6. The system of claim 2, wherein the instructions to process the digital images comprise instructions that are configured to, when executed, cause the processor to calculate, for each bruise, a coordinate of a center of the bruise relative to a coordinate system established for a section of the roof on which the bruise appears.

7. The system of claim 1, wherein:
the storm data further comprises corroborating damage data of a neighboring property; and
the instructions to analyze the storm data and the content that comprises damage to determine whether the damage is consistent with the actual, naturally occurring storm event further comprise instructions to determine whether the damage matches the corroborating damage data of the neighboring property.

8. A method of identifying a type of damage to a property based on a set of images of the property, the method comprising:
by an image sensor:
capturing a plurality of digital images of a facet of a property, and
transmitting the digital images to a processing device;
by the processing device, executing programming instructions that cause the processing device to:
receive the plurality of digital images of the facet of the property,
receive, from a data source, storm data relating to an actual, naturally-occurring storm event,
receive, from a data source, claim data related to a property damage claim of the property, wherein the claim data comprises data identifying the actual, naturally-occurring storm event,
process the plurality of digital images using the claim data to automatically identify content that comprises damage to the facet of the property, wherein:
processing the digital images comprises segmenting at least one of the digital images into a plurality of subsections; and
the segmenting of at least one of the digital images comprises, for each digital image that is to be segmented:
producing an initial edge map by extracting a plurality of edges from the image, so that at least some of the edges correspond to boundaries of an element of the facet,
by an edge detector, detecting a plurality of lines in the image,
determining a top N orientations of the lines, based on those orientations that occur most frequently in the image,
producing an enhanced edge map by adding pixels that are covered by the lines that are oriented in one of the top N orientations to the initial edge map, and
filling a plurality of cells of the enhanced edge map;
analyze the storm data and the content that comprises damage to determine whether the damage is consistent with the actual, naturally occurring storm event by, for each of the digital images, doing one or more of the following:
accessing a trained model that represents statistical behavior of certain features corresponding to images of facets with actual damage, extracting features from the digital image, and computing a deviation of the features extracted from the digital image from features of the trained model; or
extracting features from the digital image, and using a classifier that has been trained on features corresponding to the extracted features to classify the digital image as associated with either naturally occurring damage or not naturally occurring damage, and output a report indicating whether the damage is consistent with the actual, naturally-occurring storm event.

9. The method of claim 8, wherein:

the facet comprises a roof;

the damage comprises one or more bruises on a roof shingle; and the storm event comprises a hail event.

10. The method of claim 9, wherein analyzing the storm data and the content that comprises damage to determine whether the damage is consistent with the actual, naturally occurring storm event further comprises performing at least one of the following:

identifying a location of the property and a size range of the one or more bruises, and determining whether the location of the property and the size range of the one or more bruises are consistent with the storm data;

identifying sizes of the one or more bruises and determining whether the identified sizes of the one or more bruises exceed a threshold minimum size that is associated with a hail storm; or identifying a section of the roof on which the one or more bruises occurred, and determining whether the identified section faces a direction from which the storm data indicates that hail was directed.

11. The method of claim 9, wherein analyzing the storm data and the content that comprises damage to determine whether the damage is consistent with the actual, naturally occurring storm event further comprises performing at least one of the following:

identifying additional damage to a facet of the property other than the roof, and determining whether the damage to the roof is consistent with the additional damage to the facet of the property other than the roof; or for any bruise that is on a shingle, determining whether or not granules of the shingle were crushed.

12. The method of claim 9, wherein analyzing the storm data and the content that comprises damage to determine whether the damage is consistent with the actual, naturally occurring storm event further comprises:

identifying a degree of randomness of the bruises by creating a histogram of the number of bruises per a unit of surface area and quantifying whether a damage pattern of the histogram exceeds a randomness threshold; and if the damage pattern exceeds the randomness threshold, determining that the one or more bruises are a result of a naturally-occurring hail event.

13. The method of claim 9, wherein the processing of the digital images comprises calculating, for each bruise, a coordinate of a center of the bruise relative to a coordinate system established for a section of the roof on which the bruise appears.

14. The method of claim 8, wherein:

the storm data further comprises corroborating damage data of a neighboring property; and the analyzing of the storm data and the content that comprises damage to determine whether the damage is consistent with the actual, naturally occurring storm event further comprises determining whether the damage matches the corroborating damage data of the neighboring property.

15. The system of claim 1, wherein:

the instructions to analyze the storm data and the content that comprises damage to determine whether the damage is consistent with the actual, naturally-occurring storm event comprise instructions to, for each of the digital images, access the trained model; and the system also comprises additional programming instructions that are configured to cause the processing device to train the model by:

receiving a corpus of images, each of which is labeled, and by a classifier, learning features of the images in the corpus that correspond to a naturally occurring event and features of the images in the corpus that correspond to a not naturally occurring event.

16. The method of claim 8 wherein:

analyzing the storm data and the content that comprises damage to determine whether the damage is consistent with the actual, naturally-occurring storm event comprises, for each of the digital images, accessing the trained model; and the method also comprises, by the processing device, training the model by:

receiving a corpus of images, each of which is labeled, and using a classifier to learn features of the images in the corpus that correspond to a naturally occurring event and features of the images in the corpus that correspond to a not naturally occurring event.

* * * * *